(12) United States Patent
Jackson

(10) Patent No.: US 6,189,832 B1
(45) Date of Patent: Feb. 20, 2001

(54) PERMANENTLY CONNECTED REMOTE LATCH MECHANISM

(75) Inventor: Frank Thomas Jackson, Lake Elsinore, CA (US)

(73) Assignee: Hartwell Corporation, Placentia, CA (US)

( * ) Notice: Under 35 U.S.C. 154(b), the term of this patent shall be extended for 0 days.

(21) Appl. No.: 09/055,042

(22) Filed: Apr. 3, 1998

(51) Int. Cl.[7] ....................................................... B64C 1/14
(52) U.S. Cl. ......................................................... 244/129.4
(58) Field of Search ............................... 244/129.4, 129.1, 244/121, 53 R, 54; 292/28; 294/82.32

(56) References Cited

U.S. PATENT DOCUMENTS

| | | | |
|---|---|---|---|
| 4,399,966 | * 8/1983 | Crudden et al. | 244/129.4 |
| 4,549,708 | 10/1985 | Norris . | |
| 4,679,750 | 7/1987 | Burhans . | |
| 5,076,514 | * 12/1991 | Melcher | 244/129.4 |

OTHER PUBLICATIONS

Drawing for Latch Assembly Load Sharing, No. H3393.
Drawing for Upper Remote System, No. SDH3783.
Drawing for Upper Remote Latching System, No. SDH3790.

* cited by examiner

Primary Examiner—Peter M. Poon
Assistant Examiner—Jagnola A. Nelson
(74) Attorney, Agent, or Firm—Pretty, Schroeder & Poplawski

(57) ABSTRACT

A remotely actuated latch mechanism for securing a cowling to an aircraft structure including a handle having a closed and an open position which is connected to a remote latch. The remote latch comprises a housing, a linkage mounted to the housing, and a strut connected to the linkage at a first end and to a keeper at a second end. The handle is connected to the linkage of the remote latch by a push/pull cable. The actuation of the handle from the closed position to the open position causes the push/pull cable to move the linkage of the remote latch such that the strut moves from a closed to an open position relative to the keeper allowing the cowling of the aircraft to then be pivoted open. The strut and the keeper are securely engaged in both the open and closed position insuring that when the latch is remotely opened and closed that the keeper is always properly engaged and that the latch properly closes.

19 Claims, 14 Drawing Sheets

PERMANENTLY CONNECTED REMOTE LATCH MECHANISM

The present invention relates generally to the field of latch mechanisms and, more particularly, to a permanently connected remote latch mechanism which secures a cowling to an aircraft structure. Although the present invention is subject to a wide range of applications, it is especially suited for use with aircraft, and will be particularly described in that connection.

BACKGROUND OF THE INVENTION

Modern jet engines are mounted on an aircraft by pylons or a similar support structure. A nacelle which circumscribes the engine forms an enclosed shelter for the engine. The nacelle is generally supported in part from the engine and in part from the engine pylon. The nacelle is aerodynamically contoured to reduce aerodynamic drag on the nacelle during operation of the aircraft.

The nacelle includes a pair of thrust reverser cowlings which form a large conical shaped structure that wraps around the aircraft engine. During aircraft operation these thrust reverser cowlings define an outer wall of the engine exhaust nozzle. Thrust reverser cowlings must be capable of withstanding considerable hoop loads caused by the high pressure of the jet exhaust stream flowing therein. The thrust reverser cowlings are normally hingedly connected to the upper portion of the nacelle near the point where the nacelle is attached to the engine pylon. The thrust reverser cowlings are hinged, so that they can be pivoted upwards, to provide access to the engine for maintenance and repair. During aircraft operation the thrust reverser cowlings must be pivoted downward into closed positions in which their ends, at the bottom split line, are adjacent to one another or adjacent to an interposed strut.

The thrust reverser cowlings are held together by tension latches during operation. The ends of the thrust reverser cowlings are normally attached together by bottom mounted tension latches located at the bottom split line. The thrust reverser cowlings are also attached at the top of each thrust reverser cowling, near the hinge line, to the aircraft structure by tension latches.

When closing the thrust reverser cowlings, the bottom tension latches are easily closed because they are clearly visible to a mechanic from the ground and can be properly closed directly by hand. The top mounted tension latches, however, are not visible to mechanics on the ground and are almost completely inaccessible. Several types of latch mechanisms attempt to solve the problem of the inaccessibility of the top mounted tension latches by utilizing remotely actuated latch mechanisms which use a hook or opposing jaws, as latches, to engage a keeper. The hook or opposing jaws are actuated by the use of a cable allowing a mechanic to open and close the top mounted tension latch from the ground at the bottom of the thrust reverser cowling. When the top mounted tension latch is remotely opened the hook or opposing jaws disengage from the keeper allowing the thrust reverser cowling to be opened. After closing the thrust reverser cowling, the top mounted tension latch can be remotely closed by the operation of the remotely actuated latch mechanism. A disadvantage of these remotely actuated latch mechanisms is that if the hook, opposing jaws, or keeper are not in the proper position, or are broken, it may be possible to close the latch without engaging the keeper thus giving a false indication that the latch is closed and resulting in a potentially unsafe condition. A further disadvantage of the use of these remotely actuated latch mechanisms is that there is no way for the mechanic to visually verify whether or not the hook or opposing jaws have properly engaged the keeper from the ground. Therefore, the mechanic operating the remotely actuated latch mechanism can never be sure that the latch is properly closed. Other types of complex mechanical linkages and even electrical actuators have been used to permit latches to be opened or closed from the ground with the same aforementioned disadvantages.

Various devices, in conjunction with the previously described remotely actuated latch mechanisms, have been used, unsuccessfully, to verify that the top mounted tension latch is properly closed. For example, previous attempts have been made to attach special devices such as sensors, feelers, or additional mechanisms to these top mounted tension latches to alert the mechanic if the latch is not properly engaged to the keeper. The disadvantage of using these devices is that these devices are also subject to failure, damage, or human error in utilizing them.

In view of the above, it should be appreciated that there is a need for a permanently connected remote latch mechanism that provides the advantages of having a top mounted tension latch that is permanently connected to a keeper on the aircraft structure insuring that when the latch is remotely closed that the keeper is always properly engaged, and therefore also obviating the need for special devices to verify that the latch is properly closed. The present invention satisfies these and other needs and provides further related advantages.

SUMMARY OF THE INVENTION

The present invention is embodied in a permanently connected remote latch mechanism having a top mounted tension latch that is permanently connected to a keeper on an aircraft structure insuring that when the latch is remotely opened and closed that the keeper is always properly engaged, and eliminates the need for special devices to verify that the latch is properly closed. Furthermore, the permanently connected remote latch mechanism, in combination with other features described below, possesses a unique relationship of slots and links that enables the motion of the latch mechanism such that the latch always properly opens without disengagement of the latch from the keeper and then allows the thrust reverser cowling to be pivoted to an open position also without disengagement of the latch from the keeper. The unique relationship of slots and links are also properly balanced to prevent the permanently connected remote latch mechanism from becoming bound in opening and closing.

The remotely actuated latch mechanism of the present invention is used for releasably securing a cowling to an aircraft structure. The latch mechanism includes a handle having an open and a closed position which is connected to a remote latch. The remote latch consists of a housing, a linkage mounted to the housing, and a strut connected to the linkage at a first end and to a keeper at a second end. The handle is connected to the linkage of the remote latch by a push/pull cable. The actuation of the handle from the closed position to the open position causes the push/pull cable to move the linkage of the remote latch such that the strut moves from a closed to an open position relative to the keeper. The movement of the strut to the open position allows the cowling of the aircraft to be opened.

An important feature of the present invention is that the strut and the keeper are securely engaged in the open and closed positions. An advantage of having a strut that is permanently connected to the keeper is that it insures that when the latch is remotely opened and closed that the keeper is always properly engaged and that the latch always properly closes. This is very important because the remote latch is mounted at the top of the thrust reverser cowling, near the hinge line, very high above the ground and a mechanic operating the remotely actuated latch mechanism cannot visually verify whether or not the latch has properly closed. If the latch does not properly close, as sometimes occurs in prior art devices where the latch can close without properly engaging the keeper, a potentially unsafe flight condition could occur. Advantageously, the latch of the present invention is permanently connected to the keeper insuring that when the latch is remotely closed that the keeper will be properly engaged, the latch will properly close, and a potentially unsafe flight condition will not occur due to the latch not properly engaging the keeper.

A further advantage of the present invention is that the need for special devices to alert a mechanic if the latch is not properly engaged to the keeper is eliminated because the remote latch of the present invention is permanently connected to the keeper and therefore always properly engages the keeper. This is advantageous because these special devices such as sensors and feelers are subject to failure, damage, or human error in utilizing them. A further related advantage of the elimination of these special devices is the corresponding elimination of the extra cost of these special devices as well as the elimination of the extra weight these special devices impart upon the aircraft.

Another significant feature of the present invention is the unique relationship of slots and links that enables the motion of the remotely actuated latch mechanism such that the latch always properly opens without disengagement of the latch from the keeper and then allows the thrust reverser cowling to be pivoted to an open position also without disengagement of the latch from the keeper. This is advantageous in that once the latch has been opened and the cowling pivoted upwards, the required repair or maintenance on the engine can then performed, and the cowling can then be pivoted back to the closed position and the latch closed without the keeper ever being disengaged from the keeper. Therefore, during the cycling of the remotely actuated latch mechanism from the closed position to the open position and back to the closed position, there is no chance for the keeper to ever become disengaged from the latch and create the possibility of a potentially unsafe flight condition.

An additional feature of the present invention is that it possesses a unique relationship of slots and links such that they are properly balanced to prevent the remotely actuated latch mechanism from becoming bound in opening and closing. This is advantageous because the thrust reverser cowls must be opened and closed in a relatively short period of time to perform the required engine repair and/or maintenance. If problems were to occur in the opening and closing of the thrust reverser cowlings due to the latch mechanism, extra time would have to be spent to repair the latch mechanism instead of the aircraft, resulting in extra cost and delayed flight times for the aircraft.

Furthermore, the present invention advantageously eliminates the longstanding problem of the keeper becoming disengaged from a latch, creating the possibility of a potentially unsafe flight condition, by a design that is simple and less expensive than previous remotely actuated latch mechanism designs.

Other features and advantages of the present invention will become apparent from the following description of the preferred embodiments, taken in conjunction with the accompanying drawings, which illustrate, by way of example, the principles of the invention.

DETAILED DESCRIPTION OF THE PREFERRED EMBODIMENTS

Figure 1:
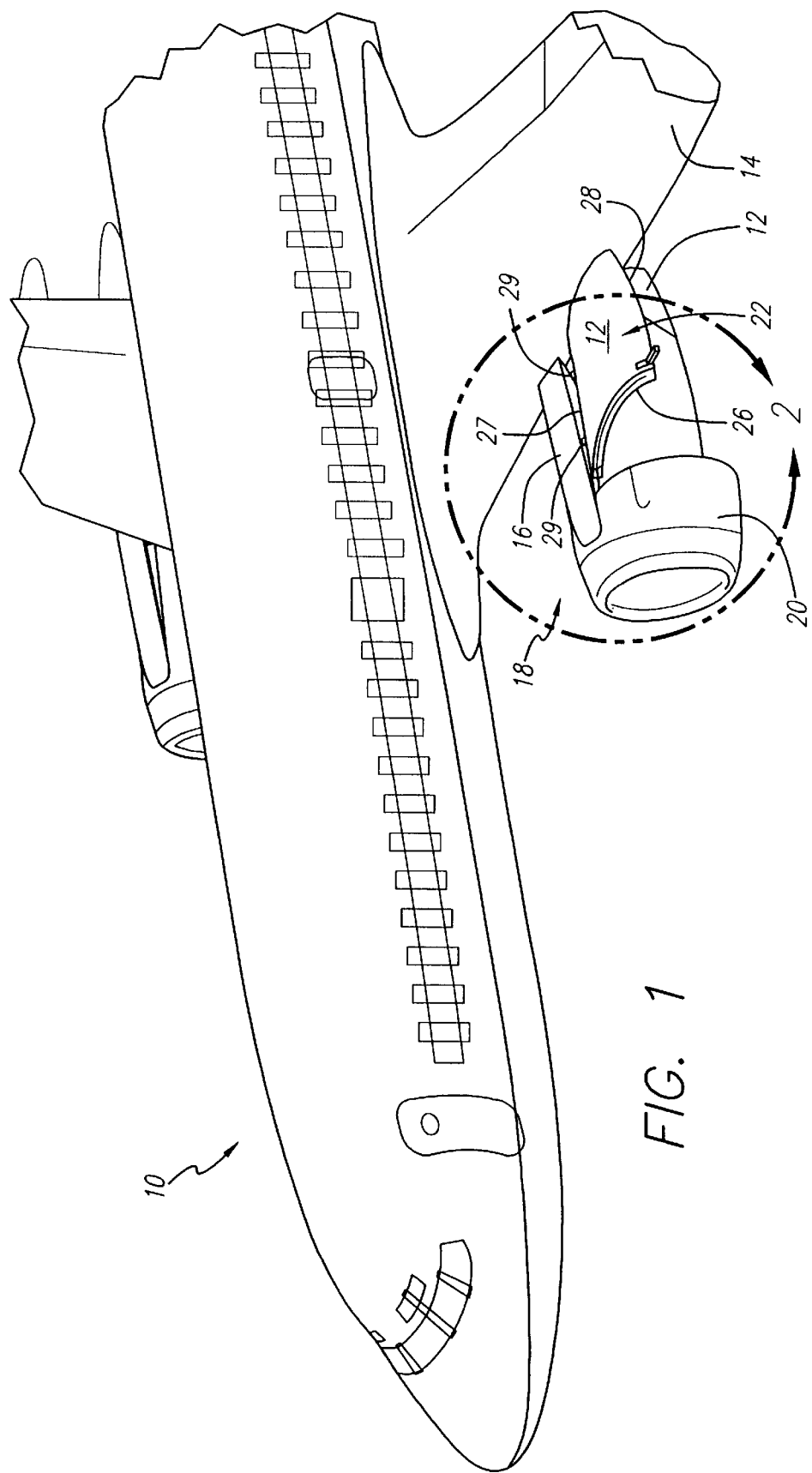
FIG. 1 is a partial perspective view of a jet aircraft having a cowling in the open position.

A jet aircraft 10 having a large jet engine 12 is shown in FIG. 1. An aircraft wing 14 extends above the jet engine 12 and the aircraft wing 14 includes an engine pylon 16 which supports the jet engine 12. A nacelle 18 is attached the engine pylon 16. The nacelle 18 circumscribes the jet engine 12 and assists the engine pylon 16 in supporting and positioning the jet engine 12 from the aircraft wing 14. The nacelle 18 consists of a pair of fan cowlings 20, one extending down from each side of the engine pylon 16, and a pair of hinged thrust reverser cowlings 22, one extending down from each side of the engine pylon 16.

Each of the thrust reverser cowling 22 defines an outer wall 24, a front sidewall 26, an upper edge 27, and a bottom edge 28. During aircraft operation, the thrust reverser cowlings define the engine exhaust nozzle. The pair of thrust reverser cowlings are capable of withstanding considerable hoop loads caused by the high pressure of the jet exhaust stream which flows through it. Each thrust reverser cowling is connected along its upper edge 27 to the engine pylon 16 by hinges 29. This permits each thrust reverser cowling to be pivoted upwards, as shown in FIG. 1, to provide access to the engine for maintenance and repair. During aircraft operation the thrust reverser cowlings are pivoted downward into closed positions in which their bottom edges are adjacent to one another forming a bottom split line.

Preferably, the thrust reverser cowlings 22 are held together at each bottom edge 28 of each thrust reverser cowling by tension latches (not shown) located at the bottom split line. The thrust reverser cowlings are also attached at the upper edge 27 of each thrust reverser crowling, near the hinges 29, to the engine pylon 16 by a remotely actuated latch mechanism 30 according to the present invention.

Figure 2:
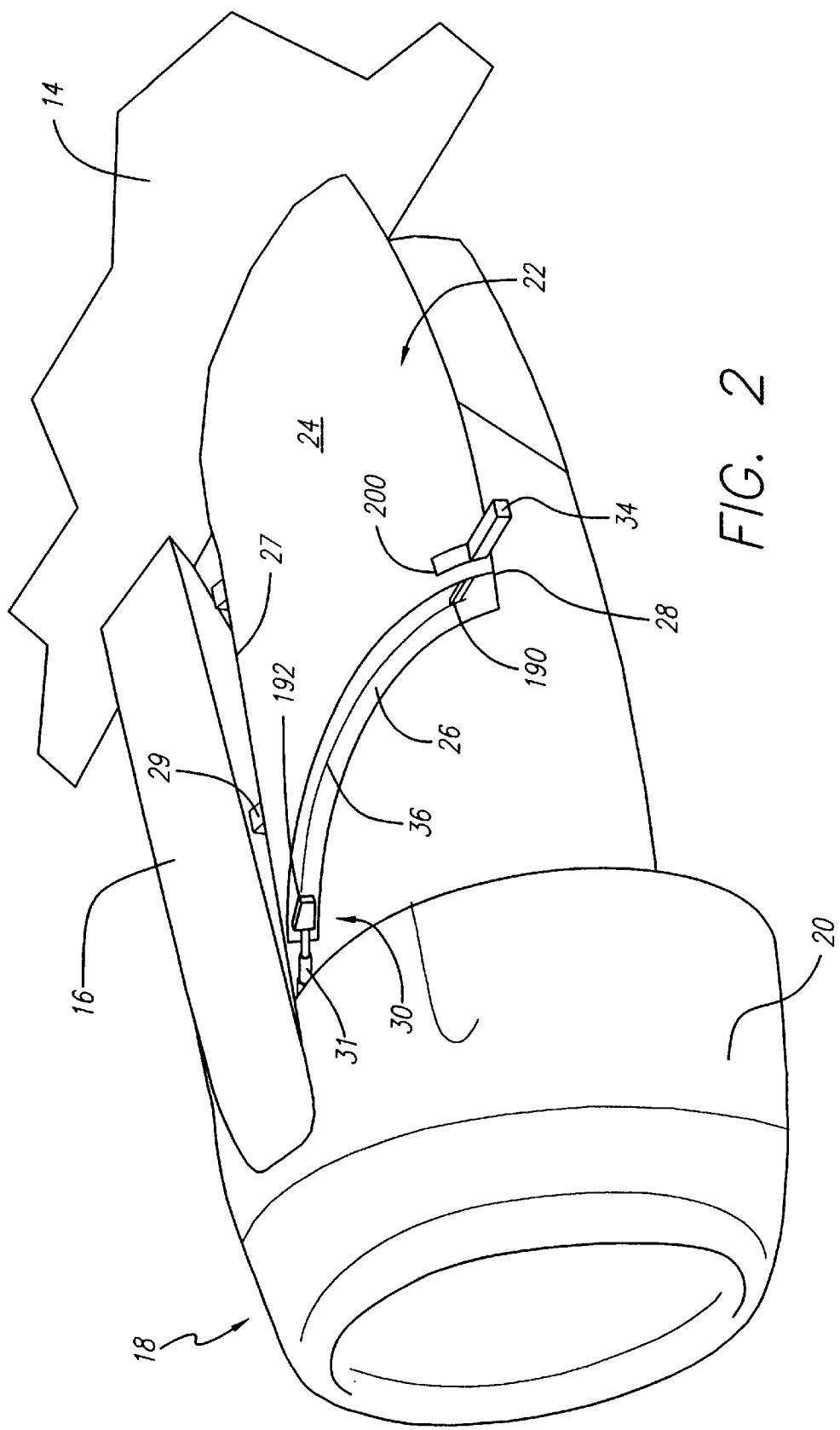
FIG. 2 is an enlarged perspective view of the portion of FIG. 1 enclosed in circle 2 of FIG. 1 showing a permanently connected remote latch mechanism according to the present invention connected between an engine pylon and the cowling.

With reference to FIG. 2, the latch mechanism 30 includes a handle 34, a push/pull cable 36, and a remote latch 31. The handle 34 is positioned and retained within a handle slot 200 in each of the thrust reverser cowlings 22. The handle slot 200 is located slightly above the bottom edge 28 and adjacent to the front sidewall 26. The push/pull cable 36 has a first end 190 and a second end 192. The first end 190 of the push/pull cable 36 is connected to the handle 34. The push/pull cable 36 extends from the first end 190 along the front sidewall 26 to the second end 192, which connects with a sliding pin 210 of the remote latch 31 (See also FIG. 3). The push/pull cable 36 permits the transfer of a load generated by the actuation of the handle 34 to the remote latch 31 allowing the handle 34 to remotely move the remote latch 31 between the open and closed positions. Push/pull cables and push/pull cables operable by handles are well known in the art.

Figure 3:
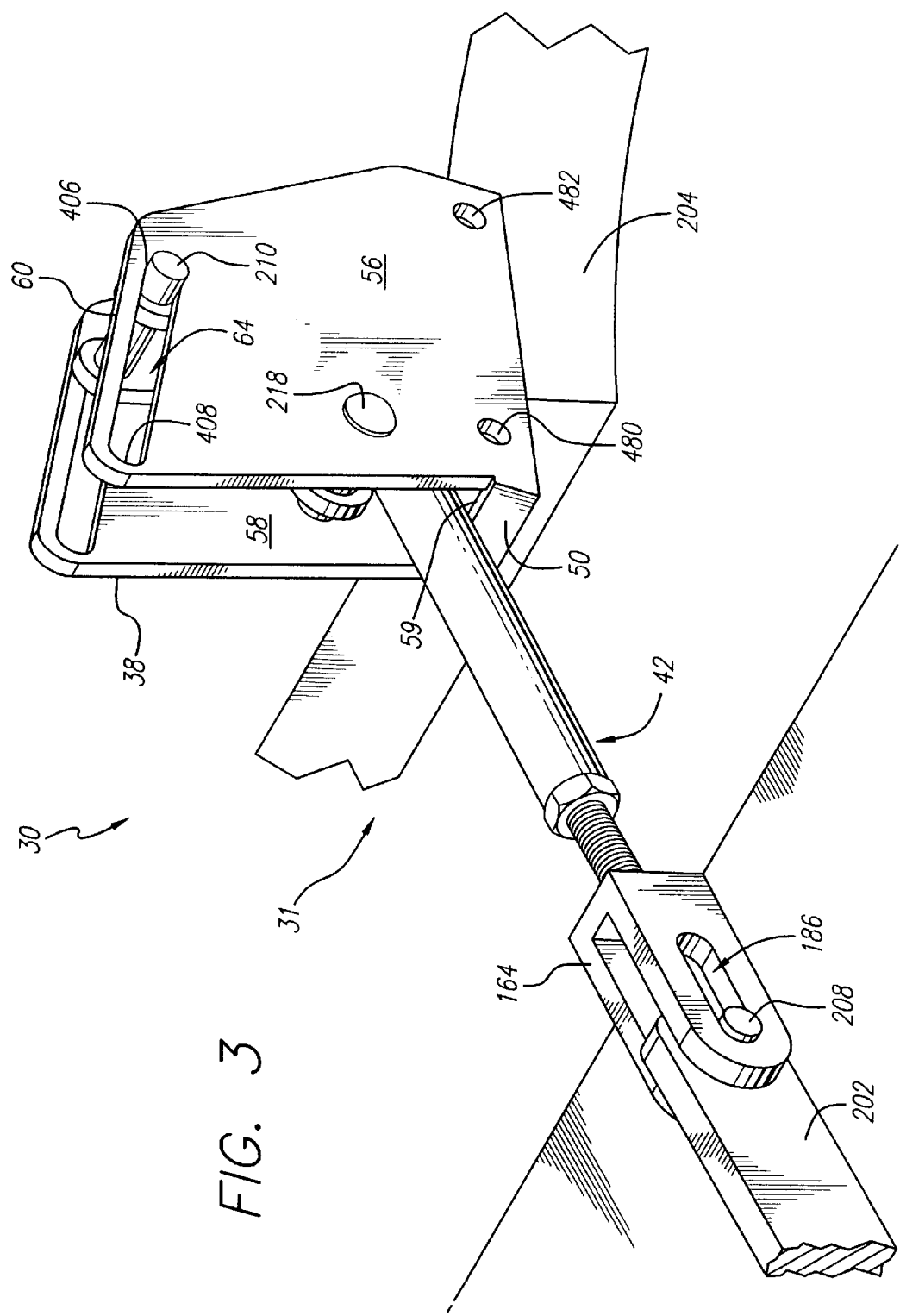
FIG. 3 is an enlarged perspective view of the permanently connected remote latch mechanism connected between the engine pylon and the cowling.
Figure 4:
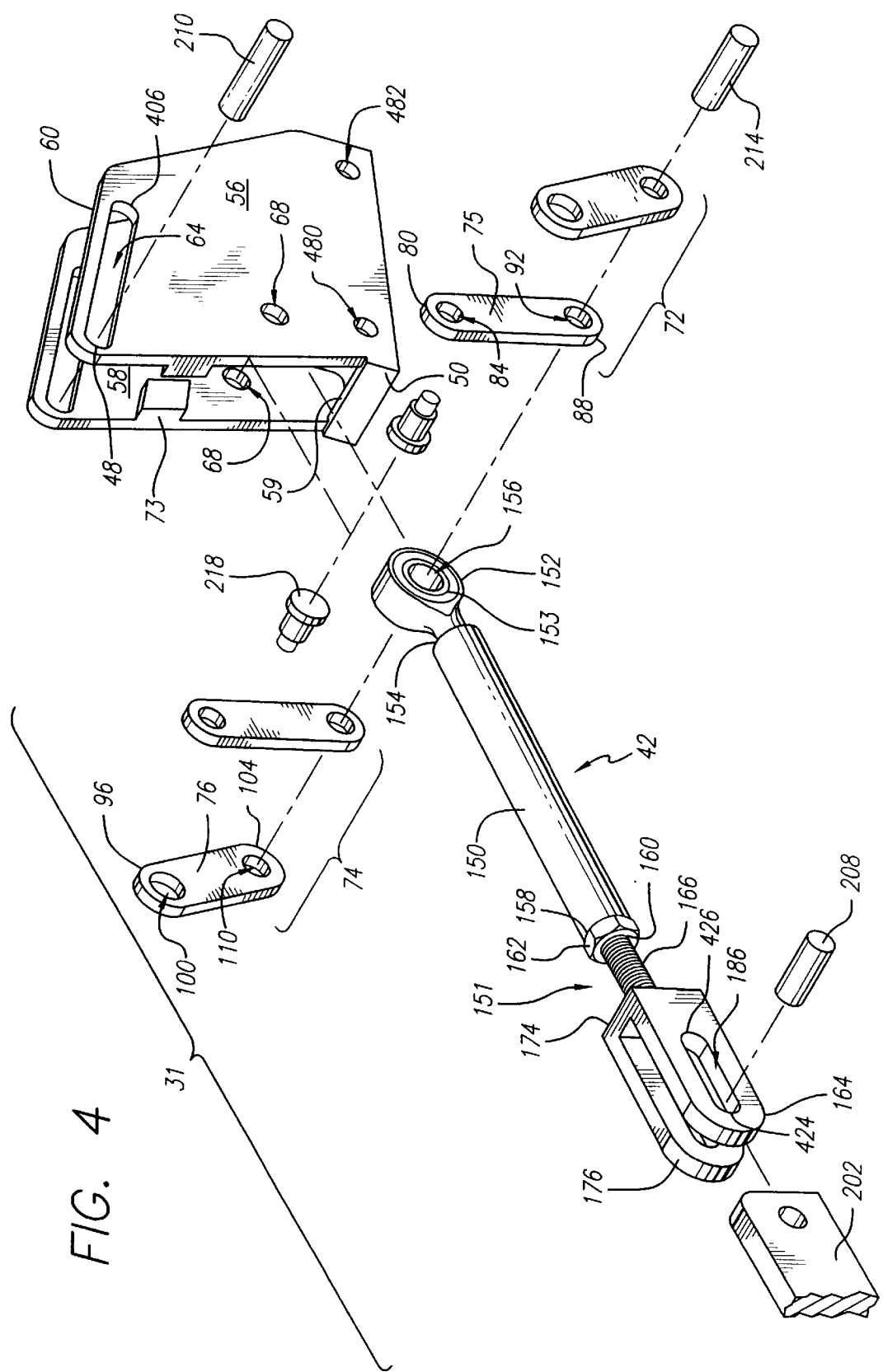
FIG. 4 is an exploded view of the permanently connected remote latch mechanism according to the present invention.
Figure 5:
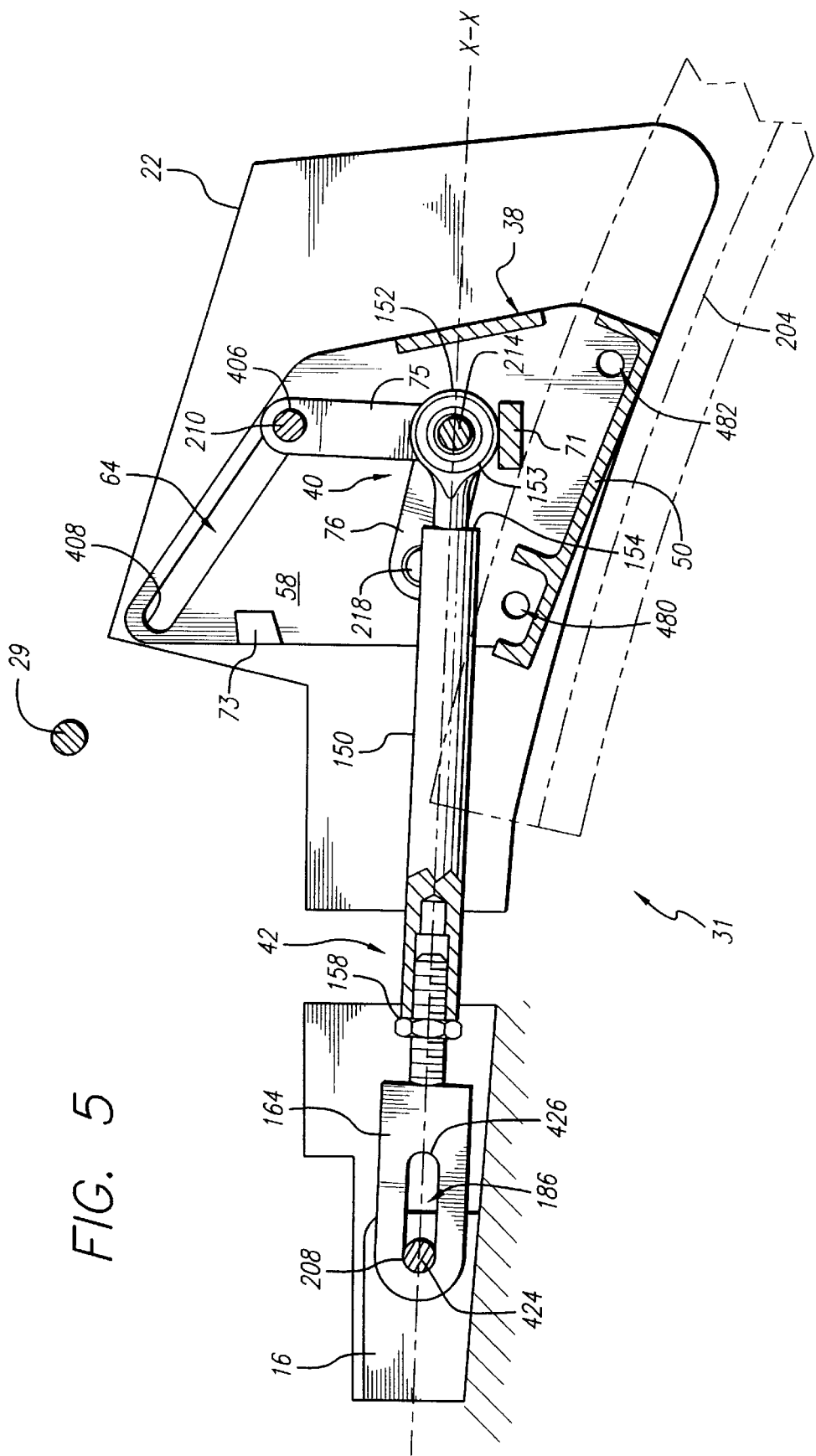
FIG. 5 is a sectional view of the permanently connected remote latch mechanism in the closed position.

With reference to FIGS. 3–5, the remote latch 31 includes a housing 38, a linking mechanism 40, and a strut 42. The housing 38 comprises a base 50 with a first wall 56 and a second wall 58 mounted to the base 50. The first and second walls 56 and 58 are spaced apart and parallel to each other and extend perpendicularly from a first side 59 of the base 50. Each wall 56 and 58 has a top edge 60 and a slot 64 adjacent to and extending parallel to each wall's respective top edge 60. The slots are parallel to one another and are aligned to receive the sliding pin 210. The slots have a first end 406 and a second end 408. Both walls 56 and 58 also have aligned holes 68, each for receiving one of a pair of step pins 218. With reference also to FIG. 5, the housing 38 also includes an over center stop 71. The over center stop 71 is a rectangular member that extends between the walls 56 and 58. Alternatively, the over center stop 71 may be a rectangular member that protrudes from the base 50 and is located between the walls. Preferably, the housing 38 also includes overextension stops 73 which are rectangular members that protrude from the walls 56 and 58.

The linking mechanism 40 includes a first linkage 72 and a second linkage 74. Each linkage includes one of a pair of release links 75 and one of a pair of over center links 76. The release links 75 are aligned and parallel to one another and each includes a first end 80, having a hole 84, and a second end 88 having a hole 92. The over center links 76 are also aligned and parallel to one another and each includes a first end 96 having a hole 100 and a second end 104 having a hole 110. The sliding pin 210 extends through each aligned holes 84 of the first end 80 of each of the release links 75 locating the release links 75 within each slot 64 of the housing 38. The step pins 218 extend through each hole 100 of the first end 96 of each of the over center links 76 connecting each of the over center links 76 to each wall 56 and 58, respectively. Preferably, the step pins 218 are riveted to each wall 56 and 58, respectively. A linkage pin 214 extends through and connects each aligned hole 92 of the second end 88 of each of the release links 75 and each aligned hole 110 of the second end 104 of each of the over center links 76. The linkage pin 214 is also rotatably mounted to the strut 42. The walls 56 and 58 prevent the linkage pin 214 from sliding out. Therefore, movement of sliding pin 210 in each slot 64 by the push/pull cable 36 results in the movement of the first and second linkage 72 and 74, and the strut 42, as will be described in more detail below.

The strut 42 includes an arm 150 and a clevis assembly 151. The arm 150 has a collar 152 at a first end 154 that defines an opening 156 for receiving the linkage pin 214. The collar 152 also includes a bearing 153 which rotatably mounts the linkage pin 214 to the strut 42. At a second end 158, the arm 150 has a threaded bore 160 for receiving the clevis assembly 151. The exterior surface of the arm 150 at its second end 158 may be provided with a nut shaped configuration 162. The clevis assembly 151 includes a clevis 164 and a threaded bolt 166 extending from a base 174 of the clevis 164. The threaded bolt 166 is inserted a desired amount into the threaded bore 160 of the arm 150. The clevis 164 includes the base 174 and first and second spaced apart parallel extensions 176 extending from the base 174. The first and second extensions 176 each have a slot 186. Each slot 186 is parallel to the other and they are aligned. Each slot 186 has a first end 424 and a second end 426.

With reference to FIG. 3, the housing 38 is mounted to a latch rim 204 within the thrust reverser cowling 22. The housing 38 has two latch mounting holes 480 and 482 which allow the housing to be mounted to the latch rim 204 by the use of nut and bolt assemblies (not shown). Also, an elongated keeper bar 202 is mounted to the engine pylon 16 and a keeper pin 208 extends transversely through the keeper bar 202.

As described above, the latch mechanism 30 is completely connected between the lower end of the cowling 22 and the engine pylon 16. The handle 34 is connected to the sliding pin 210 of the remote latch 31 by the push/pull cable 36. Linkage pin 214 connects the strut 42 through the linking mechanism 40 to the sliding pin 210. The strut 42 is connected to the keeper bar 202 of the engine pylon 16 by the keeper pin 208 which is mounted within the aligned and parallel slots 186 of the clevis 164. Since the keeper pin 208 is retained within each slot 186 of the clevis 164, the remote latch 31 remains permanently connected in both the open and closed positions.

The operation of the latch mechanism 30 proceeds as follows. With reference to FIG. 5, the remote latch 31 is in a closed position such that the sliding pin 210 abuts the first end 406 of the slot 64 of the second wall 58 of the housing 38 and the keeper pin 208 abuts the first end 424 of the slot 186 of the clevis 164. It should be appreciated that FIGS. 5–8 illustrating the operation of the remote latch 31 are sectional views and therefore the description of the operation as to the illustrated sectional view applies to the other corresponding half of the remote latch 31.

With the remote latch 31 in the closed position, the cowling 22 is closed and the load of the cowling 22 is carried along a line X—X between the keeper pin 208 and the linkage pin 214 and then to the step pin 218. It should be appreciated that, in the closed position, the strut 42 has an over center position relative to the center of the step pin 218. The over center position prevents the strut 42 from inadvertently rotating out of the closed position until the handle is actuated. In the closed position, the collar 152 of the arm 150 abuts the stop 71 of the housing 38.

Figure 6:
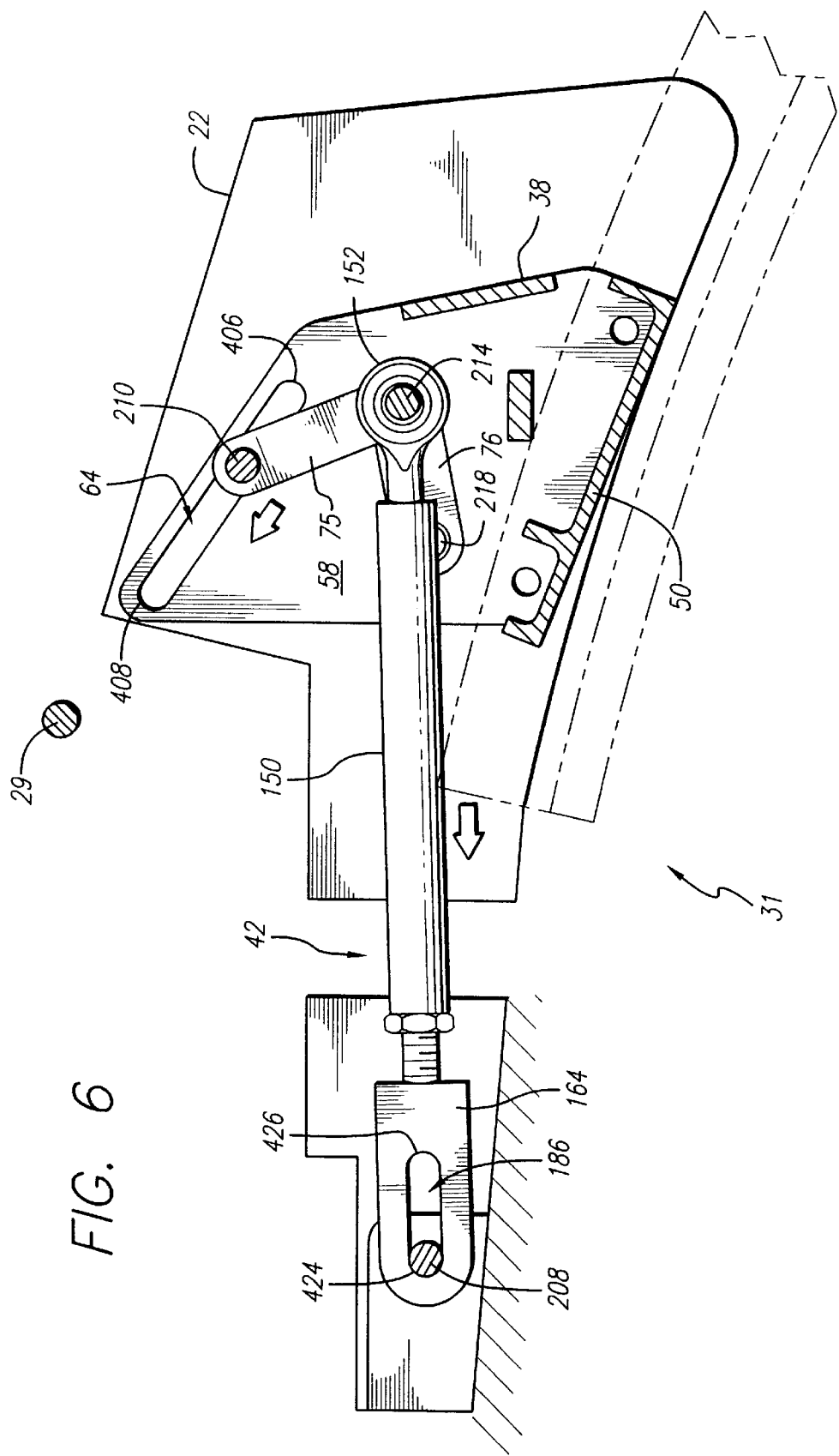
FIG. 6 is a sectional view of the permanently connected remote latch mechanism in the partially open position.

To open the remote latch 31, the handle 34 (FIG. 2) is pulled towards the open position which in turn pushes the push/pull cable 36. With reference to FIG. 6, the push/pull cable 36 pushes the sliding pin 210 upwardly along the slot 64 of the second wall 58 towards the second end 408 of the slot 64. As the sliding pin 210 moves along the slot 64, the release link 75 pulls the collar 152 of the arm 150 across the center of bolt 218 and forces the over center link 76 to rotate about the step pin 218. The load of the cowling 22 is then transferred to the over center link 76 and through the step pin 218 to the housing 38 and to the hinge 29 to open the cowling 22. As the sliding pin 210 is moved further along the slot 64 the clevis 164 will begin to move along the keeper pin 208.

Figure 7:
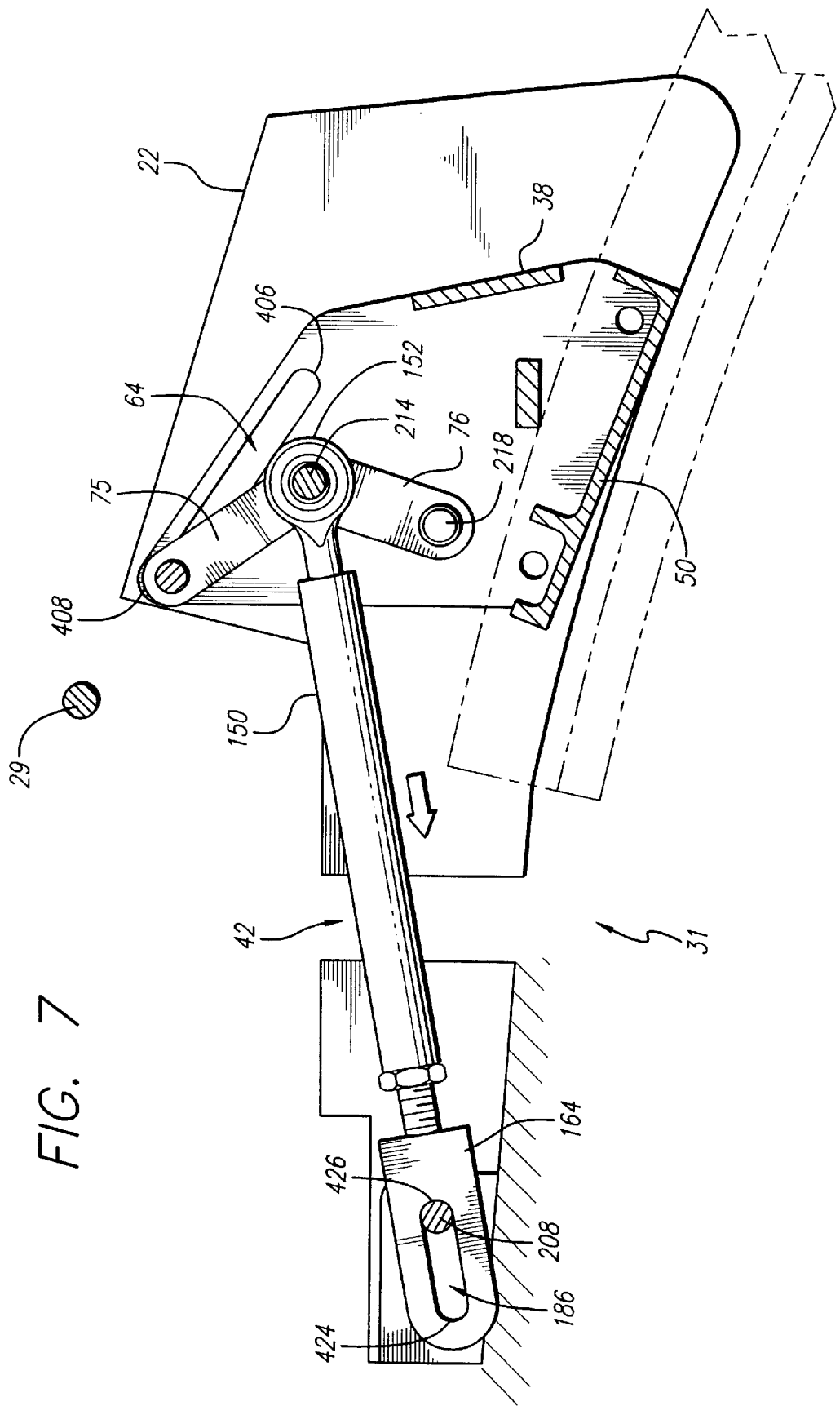
FIG. 7 is a sectional view of the permanently connected remote latch mechanism in the fully open position.

To fully open the remote latch 31, the handle 34 is pulled to the fully open position. With reference to FIG. 7, the push/pull cable 36 pushes the sliding pin 210 to the second end 408 of the slot 64 of the second wall 58 to the fully open position. The movement of the sliding pin 210 to the second end 408 of the slot 64 causes the release link 75 to rotate the collar 152 of the arm 150 about the step pin 218 even further and forces the over center link 76 to rotate about the step pin 218 even further. When the sliding pin 210 has been pushed against the second end 408 of the slot 64, the clevis 164 has moved along the keeper pin 208 to the point that the keeper pin 208 abuts against the second end 426 of the slot 186. The remote latch 31 is now fully opened and the thrust reverser cowling 22 can now be manually opened.

Figure 8:
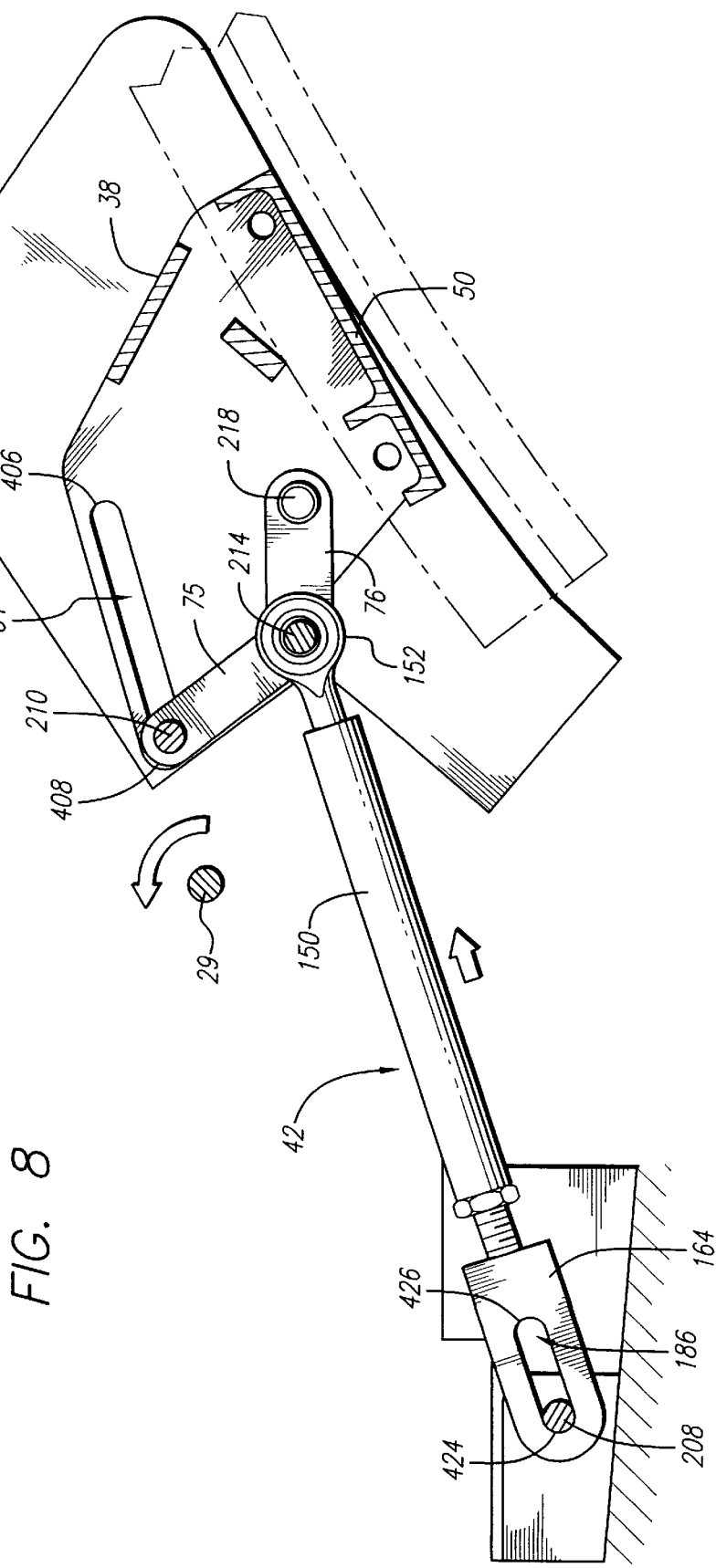
FIG. 8 is a sectional view of the permanently connected remote latch mechanism in the fully open position with the cowling pivoted upwards to an open position.

As shown in FIG. 8, the cowling 22 and the latch mechanism 30 pivot about the hinge 29. As the thrust reverser cowling 22 is opened the clevis 164 can move from the point where the keeper pin 208 abuts against the second end 426 of the slot 186, as shown in FIG. 7, to the point where the keeper pin 208 abuts against the first end 424 of the slot 186. The movement of the clevis 164 along the keeper pin 208 allows the remote latch 31 to move along with the thrust reverser cowling 22 as the cowling 22 is pivoted about the hinge 29 during opening.

After the desired repair or maintenance is performed on the jet engine 12 the thrust reverser cowling 22 can be manually closed. The remote latch 31 can be closed by simply pushing the handle 34 (FIG. 2) to the closed position causing the push/pull cable 36 to pull the sliding pin 210 back to the first end 406 of the slot 64. The process by which the remote latch 31 is closed is simply the reverse of the process by which the remote latch 31 is opened. The advantage of the remote latch 31 is that it provides a latch that is permanently connected to the keeper pin 208 on the aircraft structure insuring that when the latch is remotely closed, the keeper pin 208 is always properly engaged. Since the latch is always properly closed the need for special devices to verify that the latch is properly closed, as used in prior art latch mechanisms, is obviated. Furthermore, the relationship between the slots of the clevis, the slots in the housing, and the linking mechanism are balanced to prevent the latch mechanism 30 from becoming bound in opening and closing.

Figure 9:
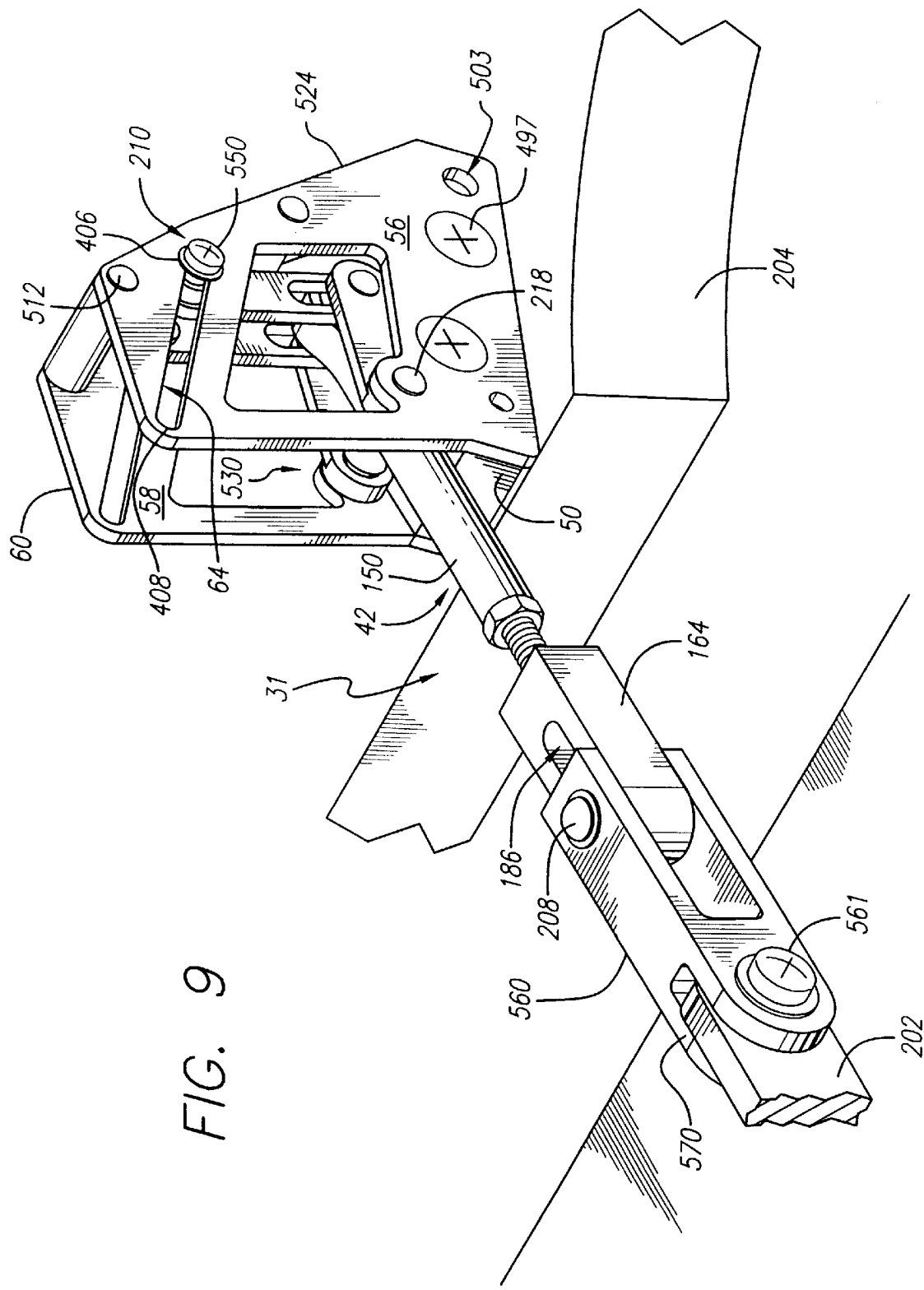
FIG. 9 is an enlarged perspective view of a second embodiment of the permanently connected remote latch mechanism connected between the engine pylon and the cowling.

The present is invention is capable of other and different embodiments, and its several details are capable of modification. For example, another embodiment configured according to the present invention is shown in FIG. 9, which is an enlarged perspective view of a second embodiment of the permanently connected remote latch mechanism connected between the engine pylon 16 and the cowling 22. Where appropriate the same reference numerals are used to avoid unnecessary duplication and description of similar elements already referred to and described above. Only the significant differences of the second embodiment as compared to the first embodiment will be discussed hereafter.

Figure 10:
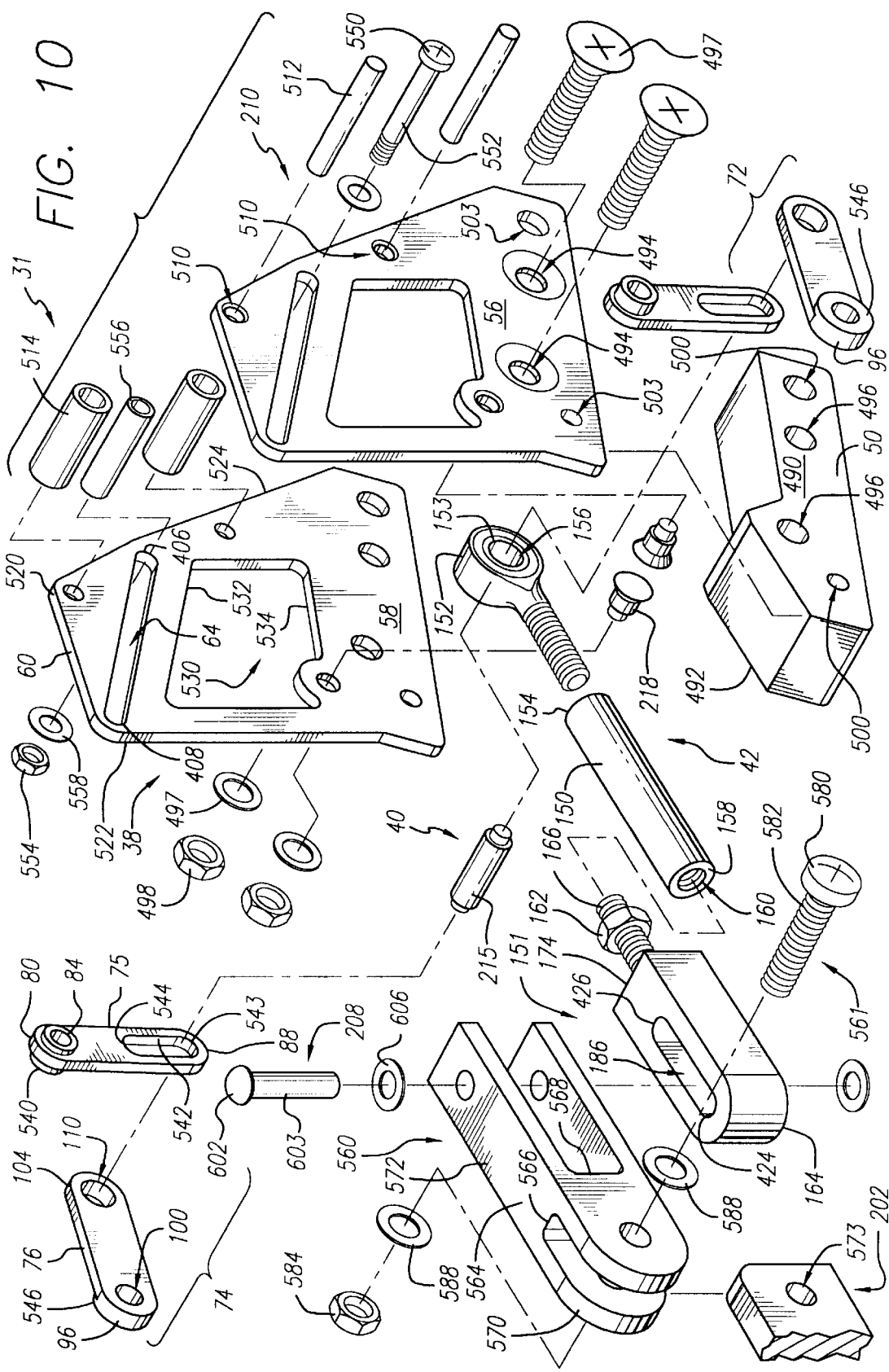
FIG. 10 is an exploded view of the permanently connected remote latch mechanism of FIG. 9.

With reference to FIGS. 9 and 10, the remote latch 31 includes a housing 38, a linking mechanism 40, and a strut 42. The housing 38 comprises a base 50, a first wall 56, and a second wall 58. The first and second walls 56 and 58 may be mounted to a first side 490 and a second side 492 of the base 50, respectively. The walls 56 and 58 are spaced apart by the base 50 and are parallel to each other. Each wall 56 and 58 has two holes 494 that also align with two holes 496 contained within the base 50. These aligned holes 494 and 496 accept screws 497, respectively, which mount the walls 56 and 58 to the base 50 by the use of nuts 498 which are tightened onto the screws 497. Also, a washer 499 may be interposed between the nuts 498 and the wall 58, respectively. Each wall has two latch rim mounting holes 503 that also align with two latch rim mounting holes 500 which extend through the base 50. These aligned holes 503 and 500 allow the housing 38 to be mounted to the latch rim 204 by the use of nut and bolt assemblies (not shown). Each wall 56 and 58 has two holes 510 which accept and retain rivets 512 that extend between and connect the walls 56 and 58. Bushings 514 surround the rivets 512 between the walls 56 and 58.

Each wall 56 and 58 has a top edge 60 with a first end 520 and a second end 522. Each wall also has a back edge 524. The second end 408 of each slot 64 is located adjacent to the second end 522 of each top edge 60. Each slot 64 extends diagonally from its respective second end 408 to its respective first end 406 adjacent to the back edge 524 of each wall. Each wall has an aperture 530 having a first edge 532 and a second edge 534. The first edge 532 extends parallel to the slot 64 and is located below the slot 64. The aperture 530 extends from its first edge 532 to the second edge 534 located above the base 50.

The linking mechanism 40 includes a first linkage 72 and a second linkage 74. Each linkage includes one of a pair of release links 75 and one of a pair of over center links 76. The release links 75 are parallel to one another and each includes a first end 80 having transversely extending flanged portions 540 which define a hole 84, and a second end 88 having a slot 542. Each slot 542 has a first end 543 and a second end 544. The over center links 76 are also parallel to one another and each includes a first end 96 having transversely extending flanged portions 546 which define a hole 100 and a second end 104 having a hole 110.

The sliding pin 210 extends through each slot 64 of the housing 38 and through each aligned hole 84 of the first end 80 of each of the release links 75 locating the release links 75 within each slot 64 of the housing 38. The sliding pin 210 consists of a bolt 550 having a shaft 552, a nut 554, a spacer 556, and a washer 558. The bolt 550 extends through the slot 64 of the first wall 56, through each aligned holes 84 of the first end 80 of each of the release links 75, and through the slot 64 of the second wall 58. Preferably, a spacer 556 surrounds the shaft 552 of the bolt 550 between the walls 56 and 58. Also, the second end 192 of the push/pull cable 36 preferably includes a rod end bearing 559 which may connect the push/pull cable 36 to the sliding pin 210 (See also FIG. 11).

The step pins 218 extend through each hole 100 of the first end 96 of each of the over center links 76 connecting each of the over center links 76 to each wall 56 and 58, respectively. Preferably the step pins 218 are riveted to each wall 56 and 58, respectively. A linkage step shaft 215 extends through and connects each aligned slot 542 of each second end 88 of each of the release links 75 and each aligned hole 110 of the second end 104 of each of the over center links 76. The linkage step shaft 215 is also rotatably mounted to the strut 42. The walls 56 and 58 prevent the linkage step shaft 215 from sliding out. Therefore, movement of sliding pin 210 in the slot 64 by the push/pull cable 36 results in the movement of the first and second linkage 72 and 74, and the strut 42, as will be described in more detail below.

The strut 42 includes an arm 150 and a clevis assembly 151. The arm 150 has a collar 152 at a first end 154 that defines an opening 156 for receiving a linkage step shaft 215. The collar 152 also includes a bearing 153 which rotatably mounts the linkage step shaft 215 to the strut 42. At a second end 158, the arm 150 has a threaded bore 160 for receiving the clevis assembly 151. The exterior surface of the arm 150 at its second end 158 may be provided with a nut shaped configuration 162. The clevis assembly 151 includes a clevis 164 and a threaded bolt 166 extending from a base 174 of the clevis 164. The threaded bolt 166 is inserted a desired amount into the threaded bore 160 of the arm 150. The clevis 164 includes a slot 186. The slot 186 has a first end 424 and a second end 426.

A receptacle 560 is mounted to the elongated keeper bar 202 of the engine pylon 16 by a mounting pin 561. The receptacle 560 includes a base 564 having a first end 566 and a second end 568. The receptacle 560 includes a first set of first and second spaced apart parallel extensions 570 extending from the first end 566. The receptacle 560 also includes a second set of first and second spaced apart parallel extensions 572 extending from the second end 568. The receptacle 560 accepts the elongated keeper bar 202 between the first set of spaced apart parallel extensions 570. The mounting pin 561 is mounted transversely through the first set of extensions 570 and through an existing latch mounting hole 573 in the elongated keeper bar 202. The mounting pin 561 consists of a bolt 580 having a shaft 582, a nut 584, a spacer (not shown), and washers 588. The bolt 580 with the spacer surrounding the shaft 582 extends through the first set extensions 570 and through the elongated keeper bar 202.

The second set of spaced apart parallel extensions 572 connects the receptacle 560 to the clevis 164. The receptacle 560 accepts the clevis 164 between the second set of spaced apart parallel extensions 572 of the receptacle 560. The keeper pin 208 is mounted transversely through the second set of extensions 572 and through the slot 186 of the clevis 164. The keeper pin 208 consists of a rivet 602 having a shaft 603, a bushing (not shown), and two washers 606. The rivet 602 with the bushing surrounding the shaft 603 extends through the second set of extensions 572 and through the slot 186 of the clevis 164 securing the receptacle 560 to the clevis 164.

As described above, the second embodiment of the latch mechanism 30 is completely connected between the lower end of the cowling 22 and the engine pylon 16. The handle 34 is connected to the sliding pin 210 of the remote latch 31 by a rod end bearing 559 which connects the push/pull cable 36 to the sliding pin 210. Linkage step shaft 215 connects the strut 42 through the linking mechanism 40 to the sliding pin 210. The strut 42 is connected to the keeper bar 202 of the engine pylon 16, through the receptacle 560, by the keeper pin 208 which is mounted within the slot 186 of the clevis 164. Since the keeper pin 208 is retained within the slot 186 of the clevis 164, the remote latch 31 remains permanently connected in both the open and closed positions.

Figure 11:
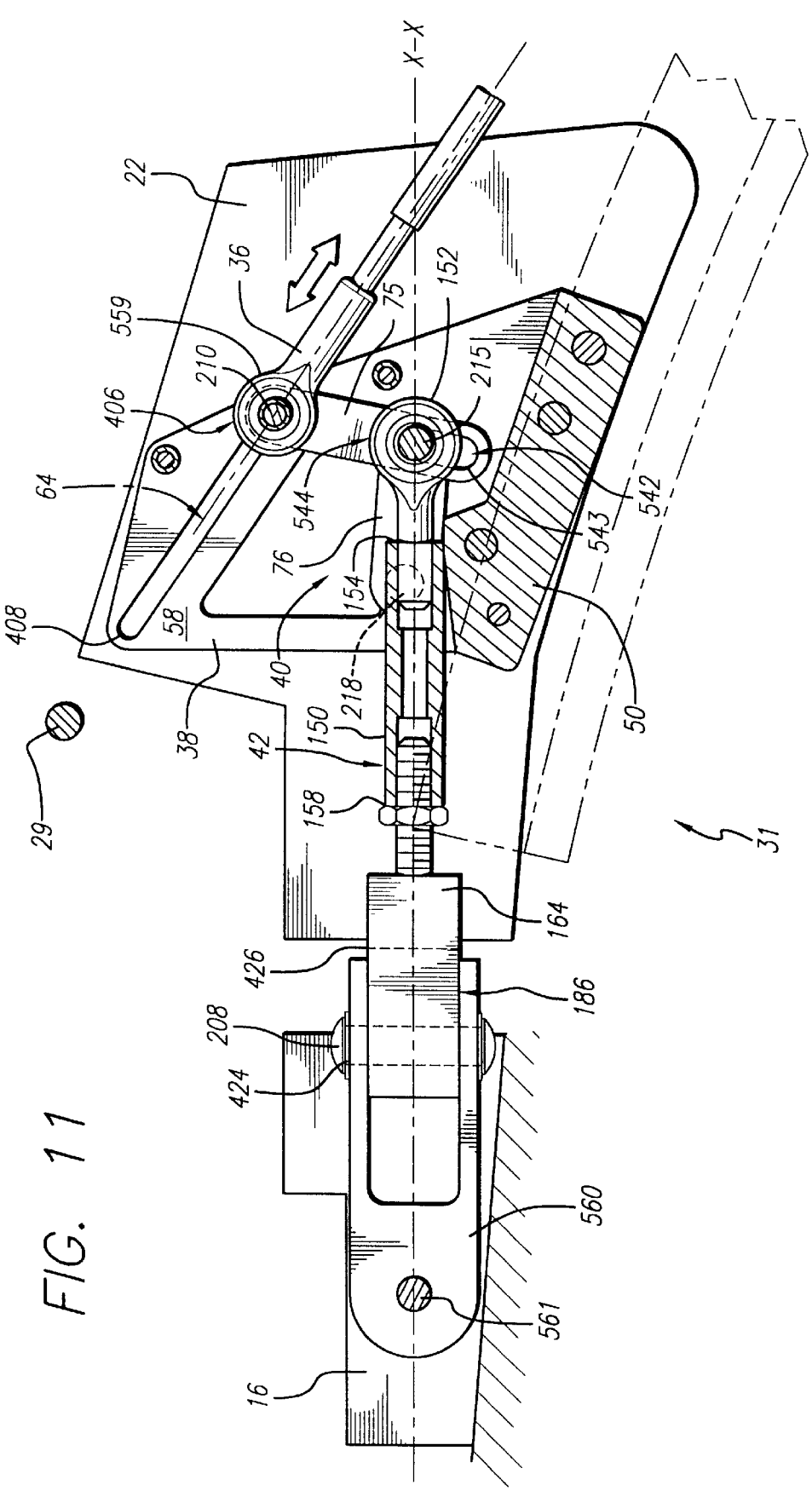
FIG. 11 is a sectional view of the second embodiment of the permanently connected remote latch mechanism in the closed position.

The operation of the second embodiment of the latch mechanism 30 proceeds as follows. With reference to FIG. 11, the remote latch 31 is in a closed position such that the sliding pin 210 abuts the first end 406 of the slot 64 of the second wall 58 of the housing 38 and the keeper pin 208 abuts the first end 424 of the slot 186 of the clevis 164. It should be appreciated that FIGS. 11–14 illustrating the operation of the remote latch 31 are sectional views and therefore the description of the operation as to the illustrated sectional view applies to the other corresponding half of the remote latch 31.

With the remote latch 31 in the closed position, the cowling 22 is closed and the load of the cowling 22 is carried along a line X—X between the mounting pin 561 and the linkage step shaft 215 and then to the step pin 218. It should be appreciated that, in the closed position, the strut 42 has an over center position relative to the center of the step pin 218. The over center position prevents the strut 42 from inadvertently rotating out of the closed position until the handle is actuated. Preferably, the linkage step shaft 215 is located at the second end 544 of the slot 542 of the release link 75. Other locations of the linkage step shaft 215 within the slot 542, however, are acceptable. For example, the linkage step shaft 215 may be located in the middle of the slot 542 or at the first end 543 of the slot 542 when the remote latch 31 is in the closed position. In the closed position, the arm 150 abuts the base 50 of the housing 38.

Figure 12:
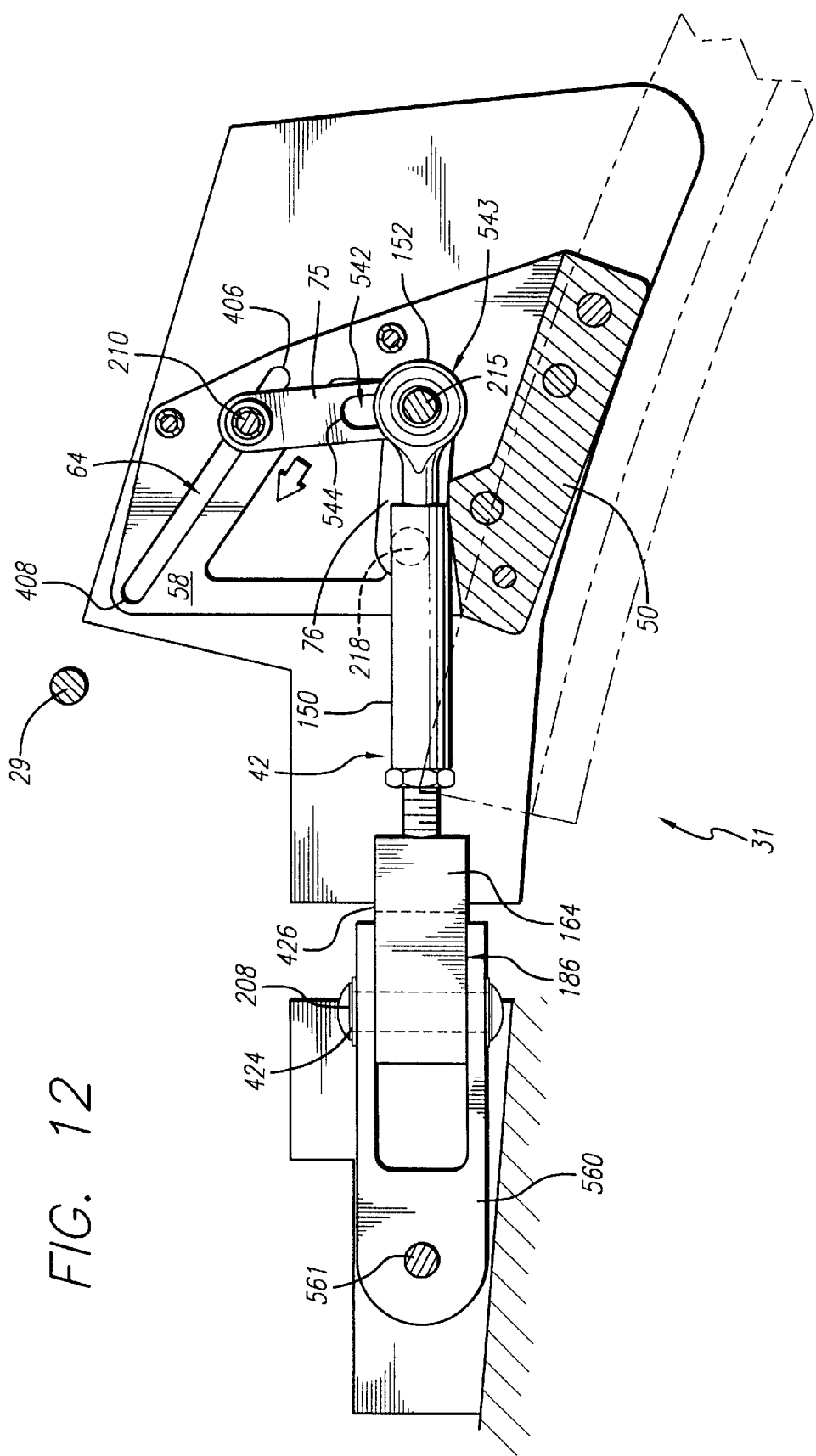
FIG. 12 is a sectional view of the second embodiment of the permanently connected remote latch mechanism in the partially open position.

To open the remote latch 31, the handle 34 (FIG. 2) is pulled towards the open position which in turn pushes the push/pull cable 36. With reference to FIG. 12, the push/pull cable 36 pushes the sliding pin 210 upwardly along the slot 64 of the second wall 58 towards the second end 408 of the slot 64. As the sliding pin 210 moves along the slot 64 the linkage step shaft 215 moves to the first end 543 of the slot 542 of the release link and the release link 75 pulls the collar 152 of the arm 150 across the center of step pin 218 and forces the over center link 76 to rotate about the step pin 218. The load of the cowling 22 is then transferred to the over center link 76 and through the step pin 218 to the housing 38 and to the hinge 29 to open the cowling 22. As the sliding pin 210 is moved further along the slot 64 the clevis 164 will begin to move along the keeper pin 208.

Figure 13:
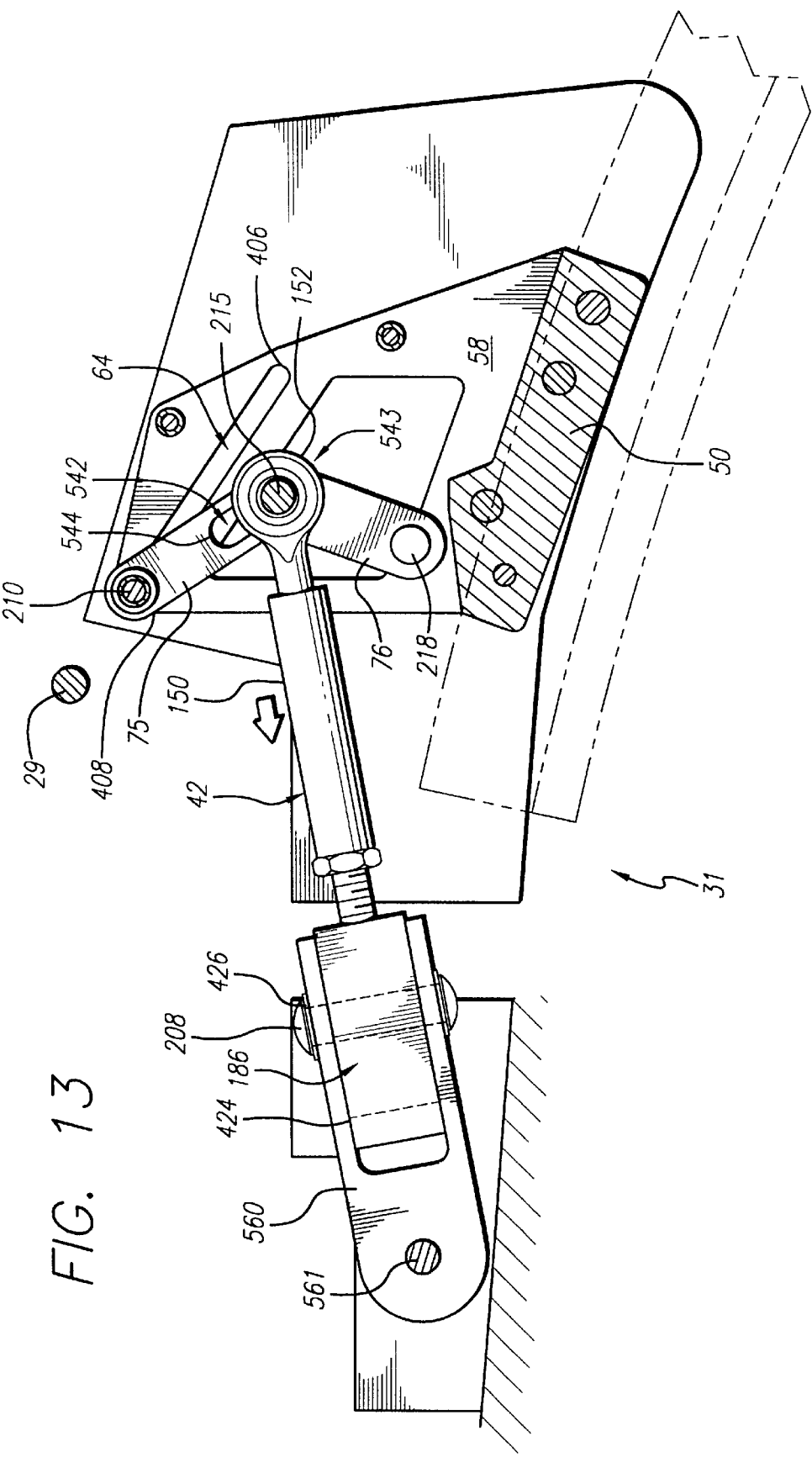
FIG. 13 is a sectional view of the second embodiment of the permanently connected remote latch mechanism in the fully open position.

To fully open the remote latch 31, the handle 34 is pulled to the fully open position. With reference to FIG. 13, the push/pull cable 36 pushes the sliding pin 210 to the second end 408 of the slot 64 of the second wall 58 to the fully open position. The movement of the sliding pin 210 to the second end 408 of the slot 64 causes the release link 75 to rotate the collar 152 of the arm 150 about the step pin 218 even further and forces the over center link 76 to rotate about the step pin 218 even further. When the sliding pin 210 has been pushed against the second end 408 of the slot 64, the clevis 164 has moved along the keeper pin 208 to the point that the keeper pin 208 abuts against the second end 426 of the slot 186 and the receptacle 560 has rotated counter-clockwise about the mounting pin 561. The remote latch 31 is now fully opened and the thrust reverser cowling 22 can now be manually opened.

Figure 14:
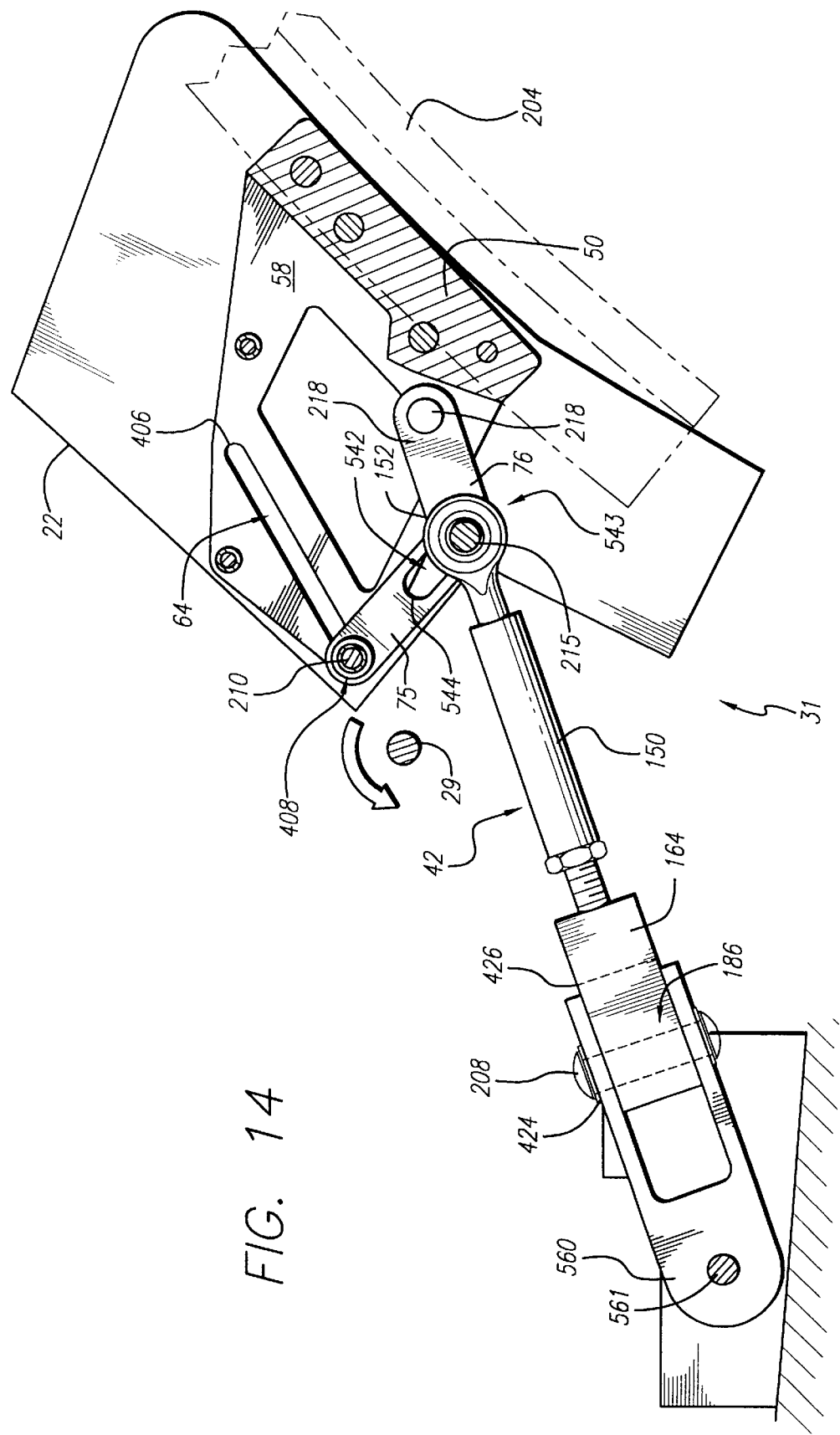
FIG. 14 is a sectional view of the permanently connected remote latch mechanism in the fully open position with the cowling pivoted upwards to an open position.

As shown in FIG. 14, the cowling 22 and the latch mechanism 30 pivot about the hinge 29. As the thrust reverser cowling 22 is opened the linkage step shaft 215 moves from an initial state where it abuts the first end 543 of the slot 542 of the release link 75, as shown in FIG. 13, to an intermediary state (not shown) where the linkage step shaft 215 abuts the second end 544 of the slot 542 of the release link 75 such that the release link 75 and the over-center link 76 are aligned parallel. As the thrust reverser cowling 22 is opened further the linkage step shaft 215 moves from the intermediary state (not shown) to the final state, as shown in FIG. 14, where the step shaft again abuts the first end 543 of the slot 542 of the release link 75. This movement of the linkage step shaft 215 within the slot 542 of the release link 75 allows the release link 75 and the overcenter link 76 to pivot about each other and particularly past the point where the release link 75 and the overcenter link 76 are aligned parallel without the links 75 and 76 becoming bound. Furthermore, as the thrust reverser cowling 22 is opened the clevis 164 can move from the point where the keeper pin 208 abuts against the second end 426 of the slot 186, as shown in FIG. 13, to the point where the keeper pin 208 abuts against the first end 424 of the slot 186 as shown in FIG. 14. The movement of the clevis 164 along the keeper pin 208 allows the remote latch 31 to move along with the thrust reverser cowling 22 as the cowling 22 is pivoted about the hinge 29 during opening.

After the desired repair or maintenance is performed on the jet engine 12 the thrust reverser cowling 22 can be manually closed. The remote latch 31 can be closed by simply pushing the handle 34 (FIG. 2) to the closed position causing the push/pull cable 36 to pull the sliding pin 210 back to the first end 406 of the slot 64. The process by which the remote latch 31 is closed is simply the reverse of the process by which the remote latch 31 is opened.

Although the invention has been described in detail with reference to only a few preferred embodiments, those having ordinary skill in the art will appreciate that various modifications can be made without departing from the spirit of the invention. For example, it should be understood that this device could also be used to remotely open and close a permanently connected latch on a variety of different cowlings on various types of aircraft. With such possibilities in mind, the invention is defined with reference to the following claims.

I claim:

1. A remotely actuated latch mechanism for securing a cowling to an aircraft structure, the latch mechanism comprising:
   a handle;
   a remote latch including a housing, a strut having a first end and a second end, a linkage mounted between the housing and the first end of the strut, and a keeper
   a slotted member mounted to the second end of the strut, the slotted member accepting and retaining the keeper; and
   a push/pull cable mounted between the handle and the linkage such that the movement of the handle between a closed position and an open position moves the strut between a first position and a second position, respectively;
   wherein in the first position, the slotted member is at a first location relative to the keeper and in the second position the slotted member is translated to a second location relative to the keeper to permit opening of the cowling; and
   wherein the slotted member and the keeper are securely engaged in the first and the second positions and during the opening and closing of the cowling.

2. The remotely actuated latch mechanism of claim 1, further comprising a linkage fastener, wherein the first end of the strut includes a collar and the linkage fastener connects the collar to the linkage.

3. The remotely actuated latch mechanism of claim 2, further comprising a bolt having a center, the bolt mounting the linkage to the housing, wherein the strut in the first position has a load line and an over center position, the load line carried between the keeper and the linkage fastener, the load line located below the center of the bolt creating the over center position of the strut relative to the center of the bolt such that the over center position prevents the strut from inadvertently rotating out of the first position.

4. The remotely actuated latch mechanism of claim 1, further comprising a second slot having a first end and a second end, and a sliding pin, wherein the housing defines the second slot, the second slot accepts and retains the sliding pin, and the sliding pin connects the push/pull cable to the linkage.

5. The remotely actuated latch mechanism of claim 1, further comprising an over center stop, wherein the over center stop protrudes from the housing and the over center stop prevents the strut from inadvertently rotating out of the first position.

6. A remotely actuated latch mechanism for securing a cowling to an aircraft structure, the latch mechanism comprising:
   a handle having an open position and a closed position;
   a remote latch including a housing, a strut having a first end and a second end, a linkage including a release link and an over center link, and a keeper;
   a clevis, the clevis located at the second end of the strut, the clevis having a first slot, the first slot having a first end and a second end, and the first slot accepting and retaining the keeper;
   a collar, the collar located at the first end of the strut;
   a linkage fastener, the linkage fastener connecting the collar to the over center link and the release link;
   a bolt having a center, the bolt mounting the over center link to the housing;
   a second slot having a first end and a second end, wherein the housing defines the second slot;
   a sliding pin accepted and retained by the second slot, the sliding pin connected to the release link; and
   a push/pull cable mounted between the handle and the sliding pin such that the movement of the handle between a closed position and an open position moves the strut between a first position and a second position, respectively;
   wherein in the first position, the clevis is at a first location relative to the keeper and in the second position the clevis is translated to a second location relative to the keeper to permit opening of the cowling; and
   wherein the clevis and the keeper are securely engaged in the first and the second positions and during the opening and closing of the cowling.

7. The remotely actuated latch mechanism of claim 6, wherein the strut in the first position has a load, a load line, and an over center position, the load line carried between the keeper and the linkage fastener, the load line located below the center of the bolt creating the over center position of the strut relative to the center of the bolt such that the over center position prevents the strut from inadvertently rotating out of the first position.

8. The remotely actuated latch mechanism of claim 7, further comprising a remote latch closed position, wherein the handle is in the closed position, the sliding pin abuts the first end of the second slot of the housing, the strut is in the first position and the over center position, and the clevis is in the first location such that the keeper abuts the first end of the first slot of the clevis.

9. The remotely actuated latch mechanism of claim 8, further comprising an over center stop, wherein the over center stop protrudes from the housing such that when the remote latch is in the closed position, the over center stop abuts the collar and prevents the strut from inadvertently rotating out of the first position.

10. The remotely actuated latch mechanism of claim 7, further comprising a remote latch toggle position, wherein as the handle is actuated between the closed and the open position the push/pull cable pushes the sliding pin upwardly between the first end and the second end of the second slot causing the release link to pull the collar of the strut upwards moving the strut out of the first position and forcing the over center link to rotate about the bolt;

wherein as the collar of the strut moves across the center of the bolt the strut is moved out of the over center position such that the load of the load line is transferred to the over center link, the bolt, and through the bolt to the housing; and wherein as the sliding pin moves upwardly between the first and second end of the second slot the first slot of the clevis moves along the keeper forcing the clevis out of the first location relative to the keeper.

11. The remotely actuated latch mechanism of claim 6, further comprising a remote latch open position, wherein the handle is actuated to the open position causing the push/pull cable to push the sliding pin upwardly along the second slot until the sliding pin abuts against the second end of the second slot forcing the release link to rotate the collar about the bolt and forcing the over center link to rotate about the bolt; and wherein when the sliding pin has been pushed against the second end of the second slot, the first slot of the clevis has moved along the keeper until the keeper abuts against the second end of the first slot such that the clevis is translated to the second location relative to the keeper and the strut has been translated to the second position.

12. The remotely actuated latch mechanism of claim 11, further comprising a cowling open position, wherein after the remote latch is in the open position the cowling can be manually opened, as the cowling is manually opened the first slot of the clevis moves along the keeper from second end to the first end such that the movement of the clevis allows the remote latch to move along with cowling as the cowling is pivoted to the open position.

13. The remotely actuated latch mechanism of claim 12, further comprising an overextension stop, the overextension stop protruding from the housing, wherein as the cowling is manually opened the over center link will abut against the overextension stop such that the overextension stop prevents the over center link from rotating about the bolt past the overextension stop.

14. The remotely actuated latch mechanism of claim 12, further comprising a cowling closed and remote latch closed position, wherein after the cowling is manually opened, the cowling is manually closed which moves the first slot of the clevis along the keeper until the keeper abuts against the second end of the first slot such that the clevis is translated to the second location relative to the keeper and the strut has been translated to the second position;

wherein after the cowling is manually closed the handle is actuated from the open position to the closed position causing the push/pull cable to pull the sliding pin from the second end of the second slot to the first end of the second slot forcing the release link to push the collar of the strut downward and forcing the over center link to rotate about the bolt; and wherein when the sliding pin has been pushed against the first end of the second slot, the first slot of the clevis has moved along the keeper until the keeper abuts against the first end of the first slot such that the clevis is translated to the first location relative to the keeper and the strut has been translated to the first position.

15. A remotely actuated latch mechanism for securing a cowling to an aircraft structure, the latch mechanism comprising:

a handle having an open position and a closed position;

a remote latch including a housing, a strut having a first end and a second end, a linkage, and a keeper, wherein the housing has a base, a first wall, and a second wall, and wherein the linkage includes a first over center link, a first release link, a second over center link, and a second release link;

a clevis, the clevis located at the second end of the strut, the clevis having a first link and a second link, the first link defining a first slot, the first slot having a first end and a second end, and the first slot accepting and retaining the keeper, the second link defining a second slot, the second slot having a first end and a second end, and the second slot accepting and retaining the keeper;

a collar, the collar located at the first end of the strut;

a linkage fastener, the linkage fastener connecting the collar to the first over center link, the first release link, the second over center link, and the second release link;

a first bolt having a center, the first bolt mounting the first over center link to the first wall of the housing;

a second bolt having a center, the second bolt mounting the second over center link to the second wall of the housing;

a third slot having a first end and a second end, wherein the first wall of the housing defines the third slot;

a fourth slot having a first end and a second end, wherein the second wall of the housing defines the fourth slot;

a sliding pin accepted and retained by the third slot and the fourth slot, the sliding pin connected to the first and second release links; and a push/pull cable mounted between the handle and the sliding pin such that the movement of the handle between a closed position and an open position moves the strut between a first position and a second position, respectively;

wherein in the first position, the clevis is at a first location relative to the keeper and in the second position the clevis is translated to a second location relative to the keeper to permit opening of the cowling; and wherein the clevis and the keeper are securely engaged in the first and the second positions and during the opening and closing of the cowling.

16. The remotely actuated latch mechanism of claim 15, wherein the strut in the first position has a load, a load line, and an over center position, the load line carried between the keeper and the linkage fastener, the load line located below the centers of the first and second bolts creating the over center position of the strut relative to the centers of the first and second bolts such that the over center position prevents the strut from inadvertently rotating out of the first position.

17. The remotely actuated latch mechanism of claim 16, further comprising a remote latch closed position, wherein the handle is in the closed position, the sliding pin abuts the first ends of the third and fourth slots of the first wall and the second wall, respectively, the strut is in the first position and the over center position, and the clevis is in the first location such that the keeper abuts the first ends of the first and second slots of the first and second links, respectively, of the clevis.

18. The remotely actuated latch mechanism of claim 17, further comprising an over center stop, wherein the over center stop protrudes between the first wall and the second wall of the housing such that when the remote latch is in the closed position, the over center stop abuts the collar and prevents the strut from inadvertently rotating out of the first position.

19. The remotely actuated latch mechanism of claim 16, further comprising a remote latch toggle position, wherein as the handle is actuated between the closed and the open position the push/pull cable pushes the sliding pin upwardly between the first ends and the second ends of the third and fourth slots, respectively, causing the first and second release links to pull the collar of the strut upwards moving the strut out of the first position and forcing the first and second over center links to rotate about the first and second bolts, respectively;

wherein as the collar of the strut moves across the centers of the first and second bolts the strut is moved out of the over center position such that the load of the load line is transferred to the first and second over center links, the first and second bolts, and through the first and second bolts to the first wall and the second wall, respectively, of the housing; and wherein as the sliding pin moves upwardly between the first and second ends of the third and fourth slots, respectively, the first and second slots of the clevis move along the keeper forcing the clevis out of the first location relative to the keeper.

* * * * *